US007580400B2

United States Patent
Sung et al.

(10) Patent No.: US 7,580,400 B2
(45) Date of Patent: Aug. 25, 2009

(54) APPARATUS AND METHOD FOR GENERATING PREAMBLE SIGNAL FOR CELL IDENTIFICATION IN AN ORTHOGONAL FREQUENCY DIVISION MULTIPLEXING SYSTEM

(75) Inventors: Sang-Hoon Sung, Suwon-si (KR);
Joong-Ho Jeong, Seoul (KR);
Yun-Sang Park, Suwon-si (KR);
Soon-Young Yoon, Seongnam-si (KR);
Tae-Gon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 709 days.

(21) Appl. No.: 10/991,895

(22) Filed: Nov. 18, 2004

(65) Prior Publication Data

US 2005/0111522 A1 May 26, 2005

(30) Foreign Application Priority Data

Nov. 21, 2003 (KR) .................... 10-2003-0083037

(51) Int. Cl.
*H04B 7/216* (2006.01)
*H04J 11/00* (2006.01)

(52) U.S. Cl. .................. 370/342; 370/430; 370/479; 370/208; 370/209; 370/203; 370/343; 370/320; 370/335; 370/441; 375/140; 375/141; 455/446; 455/447

(58) Field of Classification Search .............. 370/320, 370/335, 342, 441, 208, 209, 479, 430, 203, 370/343; 455/446, 447; 375/140, 141
See application file for complete search history.

(56) References Cited

U.S. PATENT DOCUMENTS

| 5,561,842 | A | * | 10/1996 | Ritter et al. ................. 455/524 |
| 5,712,869 | A | * | 1/1998 | Lee et al. ..................... 375/141 |
| 6,041,124 | A | * | 3/2000 | Sugita ......................... 380/270 |
| 6,377,539 | B1 | * | 4/2002 | Kang et al. .................. 370/209 |
| 6,724,741 | B1 | * | 4/2004 | Nieczyporowicz et al. .. 370/335 |
| 6,757,320 | B2 | * | 6/2004 | Tiedemann et al. ......... 375/141 |
| 2002/0191676 | A1 | * | 12/2002 | Kenneth ...................... 375/130 |
| 2004/0042388 | A1 | * | 3/2004 | Yotsumoto et al. .......... 370/208 |
| 2004/0052314 | A1 | * | 3/2004 | Copeland ..................... 375/296 |

* cited by examiner

*Primary Examiner*—Patrick N Edouard
*Assistant Examiner*—Shantell Heiber
(74) *Attorney, Agent, or Firm*—The Farrell Law Firm, LLP

(57) ABSTRACT

Disclosed are an apparatus and a method for generating a preamble signal for cell identification in an OFDM mobile communication system. The method includes the steps of generating a Walsh code symbol for a cell identification by combining Walsh codewords having a predetermined length and generating the preamble signal through multiplying the Walsh code symbol by a pseudo noise (PN) code having a length identical to a length of the Walsh code symbol.

15 Claims, 14 Drawing Sheets

APPARATUS AND METHOD FOR GENERATING PREAMBLE SIGNAL FOR CELL IDENTIFICATION IN AN ORTHOGONAL FREQUENCY DIVISION MULTIPLEXING SYSTEM

PRIORITY

This application claims priority to an application entitled "Apparatus And Method For Generating Preamble Signal For Cell Identification In An Orthogonal Frequency Division Multiplexing System" filed with the Korean Intellectual Property Office on Nov. 21, 2003 and assigned Serial No. 2003-83037, the contents of which are incorporated herein by reference.

BACKGROUND OF THE INVENTION

1. Field of the Invention

The present invention relates to a mobile communication system, and more particularly to an apparatus and a method for generating a preamble signal for cell identification in an OFDM (Orthogonal Frequency Division Multiplexing) mobile communication system.

2. Description of the Related Art

The current 3G mobile communication system is evolving into a 4G mobile communication system. Unlike previous mobile communication systems which provide simple wireless communication services exclusively, the 4G mobile communication system is being standardized for the purpose of efficient interworking between a wired communication network and a wireless communication network in order to provide integrated wired/wireless communication services at a high speed.

When a signal is transmitted through a wireless channel in the above mobile communication systems, the transmitted signal is subject to multipath interference due to various obstacles existing between a transmitter and a receiver. Characteristics of a wireless channel having multipaths depend on a maximum delay spread and a transmission period of a signal. If the transmission period of the signal is longer than the maximum delay spread, interference may not occur between continuous signals and a frequency characteristic of a channel is determined as frequency nonselective fading.

However, if a single carrier scheme is used when transmitting high-speed data having a short symbol interval, intersymbol interference may increase, causing signal distortion. Thus, the complexity of an equalizer at a user equipment may have to increase in order to effectively deal with this distortion.

To solve the above problem of the single carrier scheme, an OFDM scheme has been suggested.

According to the OFDM scheme, a multi-carrier is used to transmit data. The OFDM scheme is a kind of an MCM (Multi Carrier Modulation) scheme, in which serial symbol arrays are converted into parallel symbol arrays, which are modulated into a plurality of sub-carriers, that is, a plurality of sub-carrier channels which are orthogonal to each other.

The OFDM scheme has been widely used for digital data communication technologies such as digital audio broadcasting (DAB), digital TV broadcasting, wireless local area network (WLAN), and wireless asynchronous transfer mode (WATM). That is, although the OFDM scheme was rarely used before due to its hardware complexity, recent advances in digital signal processing technology including fast Fourier transform (FFT) and inverse fast Fourier transform (IFFT) enable the OFDM scheme to be implemented in the mobile communication system.

The OFDM scheme is similar to a conventional FDM (Frequency Division Multiplexing) scheme, but the OFDM scheme has its unique characteristics. Among other things, the OFDM scheme can transmit a plurality of sub-carriers while maintaining orthogonality among them, thereby obtaining the optimum transmission efficiency when transmitting high-speed data. In addition, since the OFDM scheme makes use of efficient frequency utilization and represents a superior characteristic against multipath fading, it can obtain optimum transmission efficiency when transmitting high-speed data.

More specifically, overlapping frequency spectrums of the OFDM scheme may lead efficient frequency utilization and superior characteristics against frequency selective fading and multipath fading. In addition, the OFDM scheme can reduce an affect of ISI (Intersymbol interference) by using a guard interval, simplify a structure of an equalizer, and reduce impulse-type noise. Thus, the OFDM scheme is widely utilized in various communication systems.

FIG. 1 is a block diagram illustrating a transmitter of a conventional OFDM mobile communication system. The OFDM mobile communication system includes a transmitter 100 and a receiver 150.

The transmitter 100 includes a encoder 104, a symbol mapper 106, a serial to parallel converter 108, an inverse fast Fourier transformer (IFFT unit) 110, a parallel to serial converter 112, a guard interval inserter 114, a digital to analog converter (D/A converter) 116, and an RF (radio frequency) processor 118.

In the transmitter 100, user data 102 including user data bits and control data bits are transmitted to the encoder 104. Upon receiving the user data 102, the encoder 104 codes user data 102 through a predetermined coding scheme and sends the data to the symbol mapper 106. Herein, the encoder 104 may code the user data 102 through a turbo coding scheme or a convolution coding scheme having a predetermined code rate. The symbol mapper 106 modulates coded bits through a predetermined modulation scheme, thereby generates modulated symbols and sends the modulated symbols to the serial to parallel converter 108. Herein, the predetermined modulation scheme includes a BPSK (binary phase shift keying) scheme, a QPSK (quadrature phase shift keying) scheme, a 16 QAM (quadrature amplitude modulation) scheme, or a 64 QAM (quadrature amplitude modulation) scheme.

Upon receiving the serial modulated symbols from the symbol mapper 106, the serial to parallel converter 108 converts the serial modulated symbols into parallel modulated symbols and sends the parallel modulated symbols to the IFFT unit 110. Upon receiving signals from the serial to parallel converter 108, the IFFT unit 110 performs N-point IFFT with respect to the signals and sends the signals to the parallel to serial converter 112.

Upon receiving the signals from the IFFT unit 110, the parallel to serial converter 112 converts the signals into serial signals and sends the serial signals to the guard interval inserter 114. The guard interval inserter 114, which has received the serial signals from the parallel to serial converter 112, inserts guard interval signals into the serial signals and sends the signals to the D/A converter 116. Insertion of the guard interval is necessary to remove interference between a previous OFDM symbol and a current OFDM symbol when OFDM signals are transmitted from an OFDM communication system.

Such a guard interval has been suggested in such a manner that null data with a predetermined interval are inserted into the guard interval. However, when the null data are transmitted into the guard interval, if the receiver erroneously estimates a start point of the OFDM symbol, interference between sub-carriers may occur so that probability of misjudgment for the received OFDM symbol may increase. Thus, a "cyclic prefix" scheme, in which predetermined after bits of an OFDM symbol in a time domain are copied and inserted into an effective OFDM symbol, or a "cyclic postfix" scheme, in which predetermined fore bits of an OFDM symbol in a time domain are copied and inserted into an effective OFDM symbol, is used.

Upon receiving signals from the guard interval inserter 114, the D/A converter 116 converts the signal into an analog signal and sends the analog signal to the RF processor 118. The RF processor 118 includes a filter and a front end unit. The RF processor 118 transmits the signal outputted from the D/A converter 116 to air through a transmit antenna after RF-processing the signal.

Hereinafter, a structure of the receiver 150 will be described. The structure of the receiver 150 is reverse to the structure of the transmitter 100.

The receiver 150 includes an RF processor 152, an analog to digital converter (A/D converter) 154, a guard interval remover 156, a serial to parallel converter 158, a fast Fourier transformer (FFT unit) 160, a channel estimator 162, an equalizer 164, a parallel to serial converter 166, a symbol demapper 168, and a decoder 170.

The signal transmitted from the transmitter 100 is received in the receiver 150 through a receive antenna while noise is being added to the signal when the signal passes through a multipath channel. The signal received through the receive antenna is inputted into the RF processor 152. The RF processor 152 down-converts the signal received through the receive antenna such that the signal has an intermediate frequency band and sends the signal to the A/D converter 154. The A/D converter 154 converts the analog signal of the RF processor 152 into a digital signal and sends the digital signal to the guard interval remover 156.

Upon receiving the digital signal from the A/D converter 154, the guard interval remover 156 removes the guard interval signals and sends serial signals to the serial to parallel converter 158. The serial to parallel converter 158, which has received the serial signals from the guard interval remover 156, converts the serial signals into parallel signals and sends the parallel signals to the FFT unit 160. The FFT unit 160 performs an N-point FFT with respect to the parallel signals outputted from the serial to parallel converter 158 and sends the signals to the equalizer 164 and the channel estimator 162. Upon receiving the signals from the FFT unit 160, the equalizer 164 performs channel equalization with respect to the signals and sends the signals to the parallel to serial converter 166. The parallel to serial converter 166 converts the parallel signals into serial signals and sends the serial signals to the symbol demapper 168.

In the meantime, the signal outputted from the FFT unit 160 is inputted into the channel estimator 162 so that the channel estimator 162 detects pilot symbols or preamble symbols from the signals of the FFT unit 160 and performs channel estimation by using the pilot symbols or the preamble signals. A result of the channel estimation is sent to the equalizer 164. In addition, the receiver 150 generates CQI (channel quality information) corresponding to the channel estimation result and sends the CQI to the transmitter 100 through a CQI transmitter (not shown).

The symbol demapper 168 demodulates the signals outputted from the parallel to serial converter 166 through a predetermined demodulation scheme and sends the decoded signals to the decoder 170. Upon receiving the demodulated signal from the symbol demapper 168, the decoder 170 decodes the demodulated signals through a predetermined decoding scheme, and then, outputs the demodulated signals as final receiving data 172. The demodulation and decoding schemes employed in the receiver 150 are corresponding to the modulation and encoding schemes employed in the transmitter 100.

In the meantime, in a cellular forward communication system employing the above OFDM/OFDMA (Othogonal Frequency Division Multiple Access) schemes, preamble signals or pilot signals, which are preset between the receiver and the transmitter, are used for the channel estimation. That is, the transmitter transmits a signal, which is already-known to the receiver, and the receiver performs the channel estimation based on the already-known signal. The preamble signal including all sub-carriers existing in one symbol interval is used for the channel estimation. Otherwise, the pilot signal used for transmitting relatively high power through at least one sub-carrier forming a predetermined symbol can be utilized for the channel estimation.

The preamble signal or the pilot signal can be used not only for the channel estimation, but also for searching a base station capable of providing optimum signal receiving performance during an initial wireless access and a handoff or for reducing a frame synchronization error in a TDD (Time Division Duplexing) system. The preamble signal signifies a signal transmitted prior to data. The preamble signal can be replaced with a mid-amble signal which is inserted between data symbols to be transmitted. Thus, it is noted that the structure and function of the preamble signal described below can be replaced with those of the preamble signal.

In general, a method of searching a cell site by using the preamble signal includes the following two steps. First, each user equipment receives a preamble signal or a mid-amble signal transmitted from a base station during a downlink transmission interval and performs an FFT (fast Fourier transform) with respect to the preamble signal. Second, a cell list for an initial wireless access or a handoff per each user equipment and a signal to interference and noise ratio (SINR) of a corresponding base station are obtained based on the FFT of the preamble or mid-amble signal.

That is, the preamble signal is used for following objects:
1. Channel estimation,
2. Relative position information estimation for user equipment in a multi-cell, and
3. Measurement for received signal power and SINR.

The preamble signal suggested for the above objects can support a maximum of six cell identifications. In order to generate the preamble signal, each base station selects a predetermined PN (pseudo noise) code and sends it to an IFFT unit. As mentioned above, since the preamble signal can support six cell identifications, six PN codes may be available. In addition, a length of the PN code corresponds to a number of sub-carriers used for the preamble signal.

FIG. 2 is a block diagram showing a structure of a conventional preamble signal receiver for searching a cell identification. When a preamble signal is transmitted from a transmitter (base station) to a receiver (user equipment), the preamble signal is parallel-converted through a serial to parallel converter 201. In addition, the preamble signal is subject to an FFT (fast Fourier transform) through an FFT unit 203 so that the preamble signal is outputted as a frequency domain signal. Then, the frequency domain signal is inputted into a PN code correlator 205 in order to detect a PN code transmitted from the transmitter. The PN code correlator 205 performs a correlation analysis with regard to a plurality of PN codes generated from a PN code generator in order to detect PN codes of the preamble signal. The analysis result of the PN code correlator 205 is inputted into a peak detector 207 and the peak detector 207 detects a peak value of the PN codes, thereby detecting the PN code of the receiving signal. As mentioned above, since the cell sites are identified according to the PN code, the cell site transmitting the signal to the receiver can be detected.

If the channel estimation is achieved by using the preamble signal received in the receiver, an output signal (frequency domain signal) of the FFT unit 203 is multiplied by corresponding PN code bit information of each sample and a resulted value thereof is used as a channel estimation value. At this time, the channel estimation value in a frequency domain, in which the sub-carrier is not used, can be calculated by using an adjacent channel estimation value. In addition, the output sample of the FFT unit 203 can be used when a frame error estimation is performed by using the conventional preamble signal. At this time, a frame synchronization error can be estimated by using a result of a conjugate multiplication for adjacent samples in the frequency domain.

However, the conventional structure for the preamble signal has the following disadvantages.

First, the conventional structure for the preamble signal uses an unique PN code for each base station in order to generate the preamble signal. According to the current standard, only six PN codes can be used for the purpose of cell identification. However, future cellular mobile communication systems may include a relatively large number of cells, so it is necessary to increase the number of PN codes for the cell identification. In order to increase the number of cells, all PN codes and a preamble signal of a modulated time domain must be stored in a memory of each user equipment. In addition, a PN correlation analysis must be carried out with regard to all PN codes during a PN code detection procedure, so a calculation time required for the PN correlation analysis may significantly be increased.

If each base station notifies the user equipment of a neighbor cell list through a predetermined broadcasting channel, a calculation time for a cell search procedure can be reduced without changing an amount of PN codes stored in the memory. However, in this case, a waste of resources can occur at a downlink due to broadcasting of neighbor cell information.

As it is generally known in the art, if a channel received in each user equipment represents a frequency selectivity, a correlation characteristic between PN codes may be degraded. Accordingly, in a cellular network having the above channel environment, each user equipment can receive a plurality of preamble signals during the same time interval. At this time, a cell search function becomes degraded due to degradation of a correlation characteristic between preamble signals received in the user equipment, so it is difficult to precisely measure receiving power of the preamble signal and the SINR of a corresponding base station.

In addition, the conventional structure for the preamble signal represents following disadvantages in view of the channel estimation. The conventional structure for the preamble signal can provide a channel estimator employing various algorithms, such as a channel estimation algorithm per each sub-carrier or a channel estimation algorithm using a frequency window obtained by grouping a plurality of sub-carriers. However, in this case, a set of sub-carriers having a similar channel frequency characteristic within a coherence bandwidth must be inputted into the channel estimator.

If the channel estimator takes a mean value after multiplying PN codes per each sub-carrier, it is possible to obtain an immunity effect for an interference signal, that is, channel estimation performance can be improved through averaging instantaneous Additive White Gaussian Noise (AWGN) peaks and using a low cross-correlation characteristic with regard to preamble signals, which are transmitted from other base stations based on other PN codes. However, according to the channel frequency characteristic in an actual cellular communication environment, the coherence bandwidth is limited within a total frequency bandwidth of at least one sub-carrier, so lengths of some PN codes used for the above operation are shortened. For this reason, it is impossible to obtain the low cross-correlation characteristic between the PN codes.

SUMMARY OF THE INVENTION

Accordingly, the present invention has been made to solve the above-mentioned problems occurring in the prior art, and an object of the present invention is to provide an apparatus and a method for generating a preamble signal capable of effectively identifying cells in an OFDM mobile communication system.

Another object of the present invention is to provide an apparatus and a method for generating a preamble signal for an efficient channel estimation in an OFDM cellular communication system.

Still another object of the present invention is to provide an apparatus and a method for generating a preamble signal by using Walsh codes having a superior cross-correlation characteristic between codes in an OFDM cellular communication system.

In order to accomplish these and other objects, according to a first aspect of the present invention, there is provided a method of generating a preamble signal in an OFDMA mobile communication system, the method including the steps of generating a Walsh code symbol for a cell identification by combining Walsh codewords having a predetermined length and generating the preamble signal by multiplying the Walsh code symbol by a PN code having a length identical to a length of the Walsh code symbol.

In order to accomplish these objects, according to a second aspect of the present invention, there is provided an apparatus for generating a preamble signal in an OFDMA mobile communication system, the apparatus including a Walsh code generator for generating a Walsh code symbol for a cell identification by combining Walsh codewords having a predetermined length per each cell, a PN code generator for generating a PN code having a length identical to a length of the Walsh code symbol and a multiplier for generating the preamble signal by multiplying the Walsh code symbol generated from the Walsh code generator by the PN code generated from the PN code generator.

In order to accomplish these objects, according to a third aspect of the present invention, there is provided a method of identifying cells by receiving a preamble signal in an OFDMA mobile communication system, the method including the steps of receiving the preamble signal generated for a cell identification by multiplying a Walsh code symbol, which is created by combining Walsh codewords having a predetermined length, by a PN code having a length identical to a length of the Walsh code symbol, detecting the Walsh code symbol by multiplying the received preamble signal by the PN code, and identifying a cell mapped into the Walsh code symbol based on the detected Walsh code symbol.

In order to accomplish these objects, according to a third aspect of the present invention, there is provided an apparatus for identifying cells by receiving a preamble signal in an OFDMA mobile communication system, the apparatus including a fast Fourier transformer receiving the preamble signal generated by multiplying a Walsh code symbol, which is created by combining Walsh codewords having a predetermined length, by a PN code having a length identical to a length of the Walsh code symbol and performing an FFT with respect to the received preamble signal so as to form an FFT preamble symbol, a PN code multiplier for multiplying the FFT preamble signal by the PN code, and a cell identifier for identifying cells based on values outputted from the PN code multiplier.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
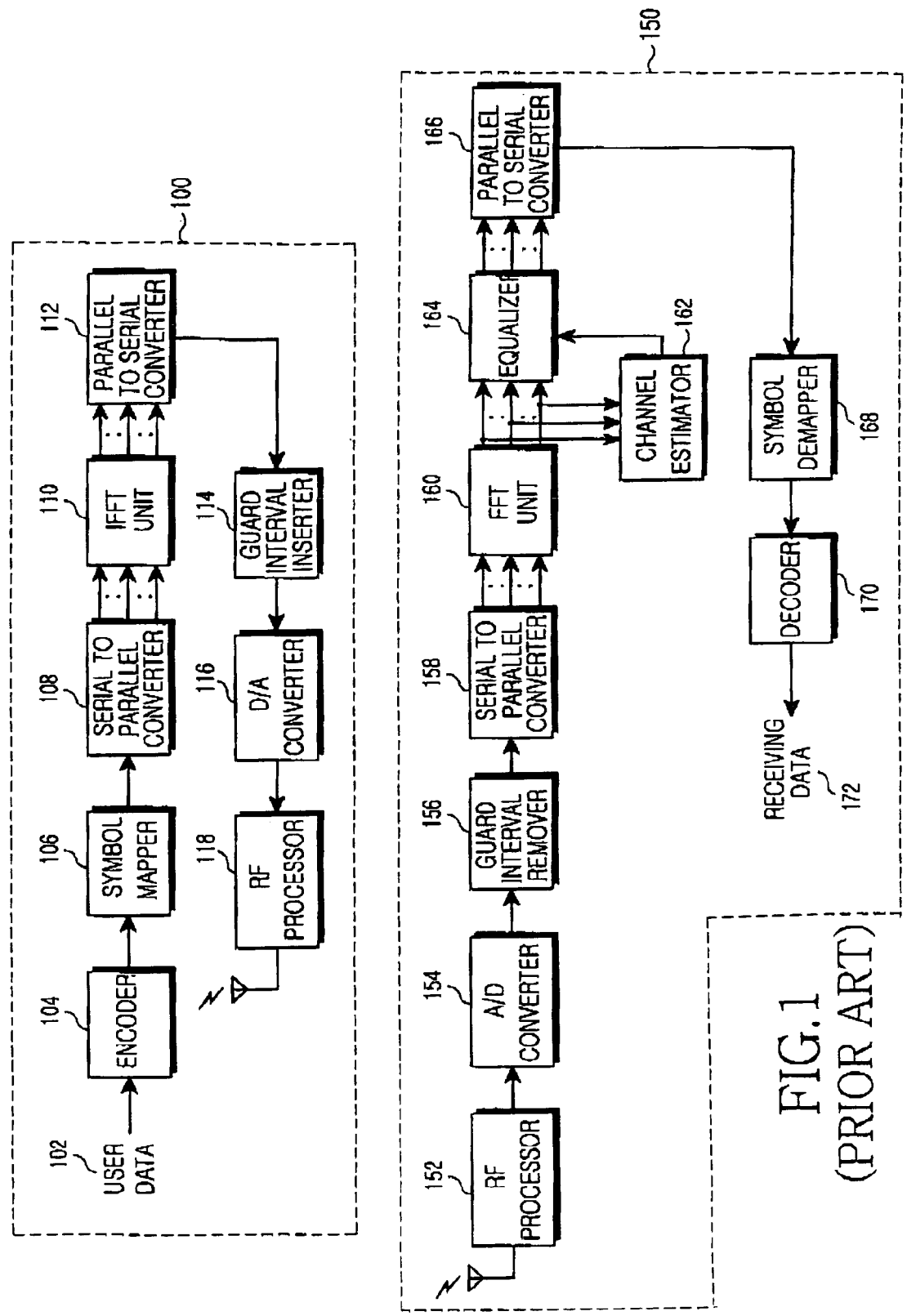
FIG. 1 is a block diagram illustrating a structure of a transmitter/receiver of a conventional OFDM system.
Figure 2:
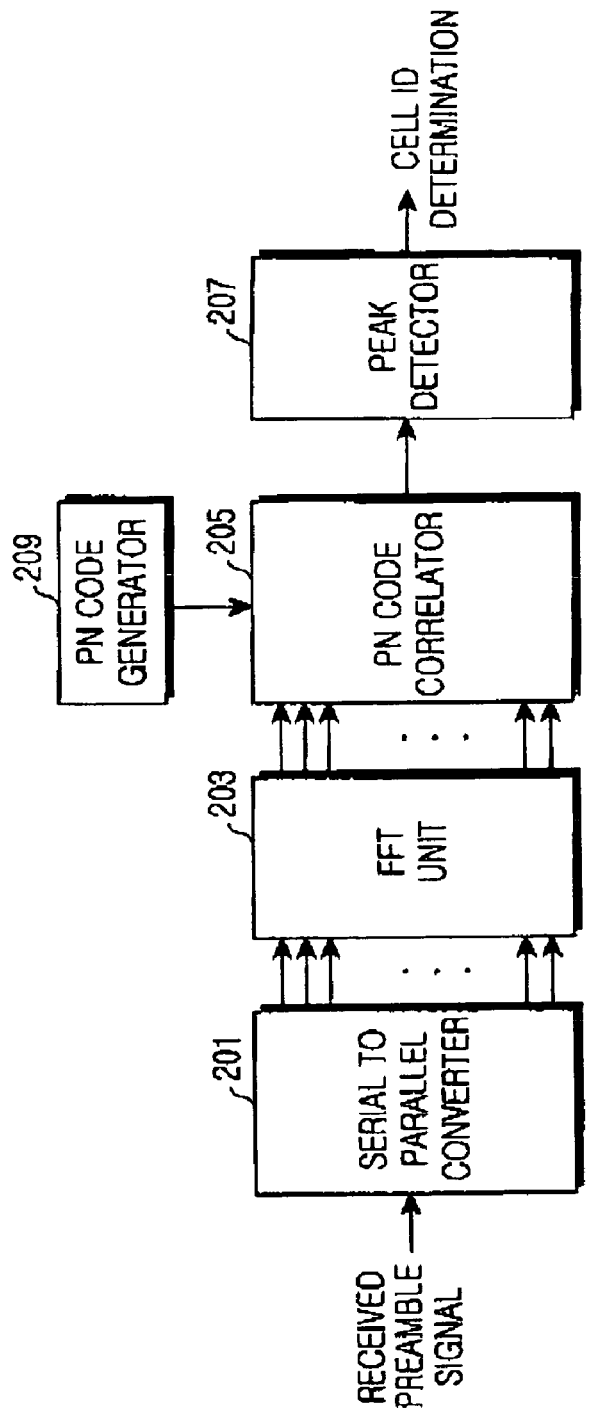
FIG. 2 is a block diagram illustrating a structure of a conventional preamble signal receiver for searching a cell identification.

Hereinafter, embodiments of the present invention will be described with reference to the accompanying drawings. In the following detailed description, representative embodiments of the present invention will be described. In addition, a detailed description of known functions and configurations incorporated herein will be omitted when it may make the subject matter of the present invention unclear.

The present invention suggests an apparatus and a method for generating a reference signal (a preamble signal or a mid-amble signal) in OFDM/OFDMA cellular communication systems, wherein the reference signal is transmitted to a user equipment from base station for the purpose of searching a cell site in order to recognize a base station capable of providing optimum signal receiving performance during a channel estimation, an initial wireless access and a handoff and for the purpose of reducing a frame synchronization error in a TDD system.

The present invention is applicable for various communication systems employing OFDM/OFDMA schemes. In addition, the present invention can provide a preamble signal capable of improving channel estimation performance, cell site detection performance, and a signal receiving sensitivity in view of a bit error rate (BER) through reducing an amount of calculation required for proper performance of the system. Furthermore, the present invention can realize a high-speed handover and can reduce power consumption.

Prior to explaining the present invention, it is noted that detection of a cell site in the OFDM/OFDMA systems can be achieved through following two steps. First, each user equipment receives a preamble signal or a mid-amble signal transmitted from a base station during a downlink transmission interval and performs an FFT with respect to the preamble signal. Second, cell identification and channel estimation are carried out by using the FFT of the preamble signal or the mid-amble signal. In the following description, a "cell" signifies a coverage area of a base station, and a "cell identification" means a "base station identification" for corresponding cells.

The present invention provides a preamble signal by combining a PN code with a Walsh code. The following description of the present invention will be made in relation to the structure of the preamble signal and a method of generating the preamble signal. It is also possible to use the mid-amble signal generated through a manner identical to that of the preamble signal.

According to the present invention, the preamble signal in the frequency domain can be generated through multiplying a W symbol by a P symbol. The W symbol is a signal obtained by combining Walsh codes through a predetermined scheme and the signal may vary depending on a cell identification (cell ID). The P symbol is a PN code which is a common signal for all base stations. Accordingly, the W symbol is used in user equipment for searching a cell, and the P symbol is multiplied by the W symbol so as to improve a correlation characteristic of the preamble signal in a time domain.

Figure 3:
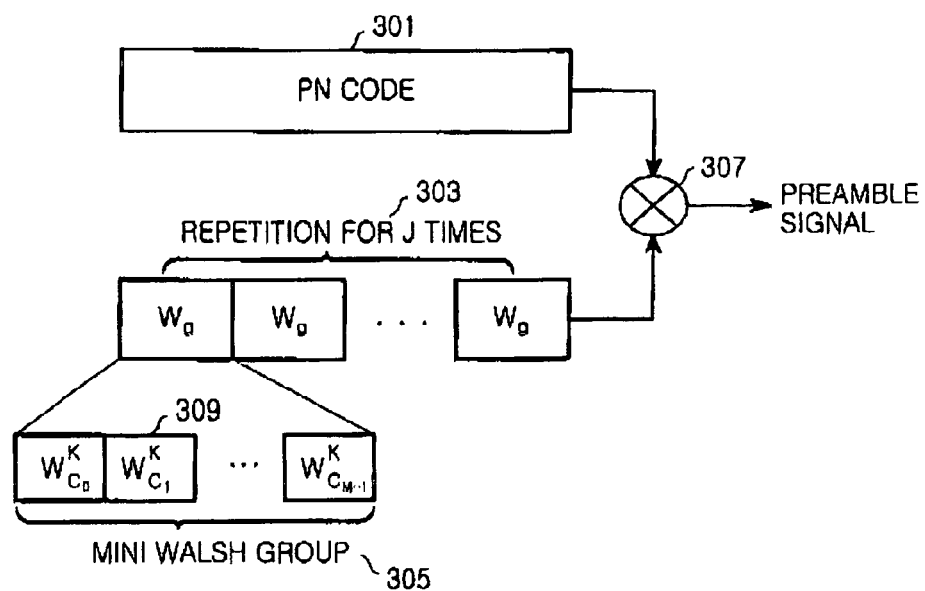
FIG. 3 is a view illustrating a structure of a preamble signal generator for a cell identification according to one embodiment of the present invention.

FIG. 3 is a view illustrating a structure of a preamble signal generator for a cell identification according to one embodiment of the present invention. The preamble signal according to the present invention can be generated through multiplying a PN symbol 301 (hereinafter, referred to as "P symbol")

consisting of PN codes by a Walsh symbol 303 (hereinafter, referred to as "W symbol") including at least one Walsh codeword by means of a multiplier 307.

As mentioned above, the P symbol 301 consisting of the PN codes is used for improving a correlation characteristic of the preamble signal in the time domain and a length of the PN code preferably correspond to the number of input points of an IFFT unit allocated to the preamble signals. In general, since the preamble signal is transmitted through all sub-carrier areas in one symbol interval, the length of the PN code matches with the number of input points of the IFFT unit, so a part of sub-carrier areas can be used. For example, if $N_{sub}$ sub-carriers are used for transmitting the preamble signal, a $p_k$ signal is allocated to a sub-carrier having a sub-carrier index k. At this time, $p_k$ signifies a $k^{th}$ value of the PN codes.

The PN codes used for the P symbol 301 are commonly applied to all base stations of the present invention. Preferably, information related to the PN codes is preliminarily stored in user equipments receiving the preamble signals. Therefore, if different PN codes are discriminately transmitted from each base station, user equipments must have information related to all PN codes. However, according to the present invention, the base stations use the same PN codes, so it is not necessary to separately store information related to the PN codes having relatively long lengths and to detect the PN codes.

In the meantime, according to the present invention, the W symbol 303 including a combination of Walsh codes is used for identifying cells and a total length of the W symbol 303 is preferably identical to a length of the P symbol 301.

The W symbol 303 includes a plurality of mini Walsh groups $W_g$ 305, which are repeated several times, and information included in a specific mini Walsh group includes ID information of each cell, which will be described later in detail. The mini Walsh group 305 is repeated J times. Preferably, a repetition time for the mini Walsh groups $W_g$ 305 is determined by taking the lengths of the P symbol and the preamble signal into consideration.

The mini Walsh group $W_g$ 305 includes a combination of at least one Walsh codeword $W_c$. For instance, the mini Walsh group $W_g$ 305 includes M Walsh codewords and an index of the Walsh codewords is allocated according to cell ID allocation information.

As mentioned above the preamble signal of the present invention can be generated in one frequency domain through multiplying bits of the W symbol by bits of the P symbol. In addition, the preamble signal generated through the above manner is mapped into each sub-carrier. Then, the preamble signal is subject to IFFT and is transmitted to the receiver (that is, user equipment) by adding a guard interval to the preamble signal.

Hereinafter, a method of generating Walsh codewords 309 forming the mini Walsh group 305 for the cell identification will be described in detail.

If cell ID information for identifying each base station is C, a value of C can be represented as a set of Walsh codeword index having M elements $\{c_0, c_1, c_2, \ldots c_{M-1}\}$. An element $c_m$ of the set $\{c_0, c_1, c_2, \ldots c_{M-1}\}$ may determine an $m^{th}$ Walsh codeword $w_{c_m}^K$ of the mini Walsh group $W_g$ 305 forming the W symbol 303.

The $w_{c_m}^K$ represents a $c_m^{th}$ code of Walsh codes having a length K. In this case, the length K must be kept larger than $c_m$ for the purpose of orthogonality between Walsh codes. In addition, when the Walsh code having the length K is used, the number of cell IDs identified according to the present invention is $K^M$.

Figure 4:
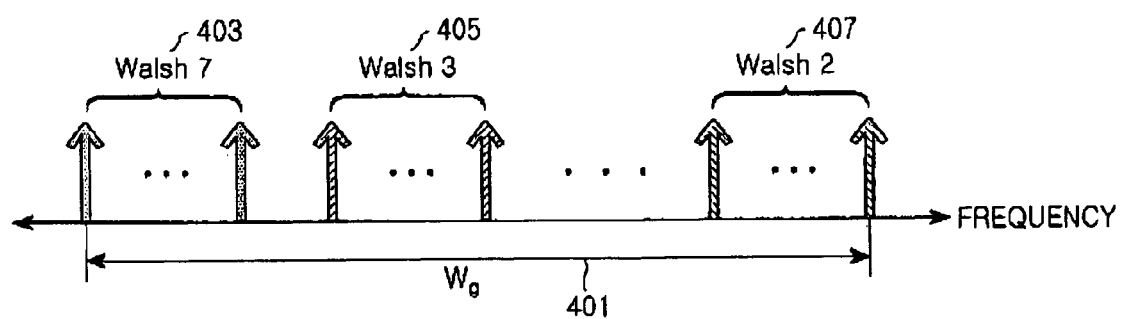
FIG. 4 is a view illustrating a method of forming a mini Walsh group according to one embodiment of the present invention.

FIG. 4 is a view illustrating a method of forming the mini Walsh group for generating the preamble signal according to one embodiment of the present invention. A mini Walsh group $W_g$ 401 is formed by combining at least one Walsh codeword. Thus, the mini Walsh group $W_g$ 401 can be formed by combining a # 7 Walsh codeword 403, a # 3 Walsh codeword 405, . . . , and a # 2 Walsh codeword 407.

The set $\{c_0, c_1, c_2, \ldots c_{M-1}\}$ of the Walsh code index according to the cell ID can be calculated through Equation 1.

$$c_m = (a_C \times m + s_C) \bmod p \qquad \text{Eq. (1)}$$

In Equation 1, C of $a_C$ and $s_C$ represents cell ID information of each cell, and m represents a Walsh codeword interval index of a specific mini Walsh group $W_g$. If the mini Walsh group $W_g$ includes M Walsh codewords, a value of m is in a range of 0 to M-1. In addition, in Equation 1, $a_C$ is a slope of a cell C, and $s_C$ is an initial Walsh codeword index value. If the Walsh codeword has a length K, $s_C$ has a value in a range of 0 to K-1. The mod means a modulo operation. That is, "a mod b" signifies that "a" is divided by "b" and a remainder thereof is outputted as a result value.

In addition, $a_C$ is necessary to prevent adjacent cells from being allocated with the same codeword index when the number of cells to be identified is larger than the number of selected codeword indexes. According to the present invention, $a_C$ is set to 1 or 2. Referring to Equation 1, if a value of $a_C$ is 1, a value of codeword index allocated to each cell may increase by 1 as a value of m increases, so a codeword index of $\{1, 2, 3, 4 \ldots\}$ is obtained. If a value of $a_C$ is 2, a value of codeword index allocated to each cell may increase by 2 as a value of m increases, so a codeword index of $\{1, 3, 5, 7 \ldots\}$ is obtained.

In Equation 1, p is a prime number representing the number of Walsh codewords, which are selected from among K Walsh codewords so as to be used for the codeword index value. Accordingly, p<K is satisfied. For instance, if a Walsh code having a length of 16 is employed, 16 orthogonal codes can be realized. If a mini Walsh group is formed by using 13 Walsh codes (# 0 to # 12 Walsh codes) from among 16 orthogonal codes, K is 16 and p is 13.

If the set of the Walsh codeword indexes is formed according to Equation 1, the same Walsh codeword is rarely allocated to adjacent cells. In addition, cell ID information C of a predetermined cell is determined according to Equation 1, and the mini Walsh group $W_g$ can be formed by using Walsh codewords having a length K.

When the mini Walsh group $W_g$ is formed according to Equation 1, among p Walsh codeword indexes selected from K Walsh codewords having the length K, M codeword indexes are determined according to Equation 1, and Walsh codewords corresponding to M codeword indexes are sequentially aligned, thereby forming the mini Walsh group $W_g$. Thus, the Walsh codeword index becomes a modulo operation of p.

Figure 5:
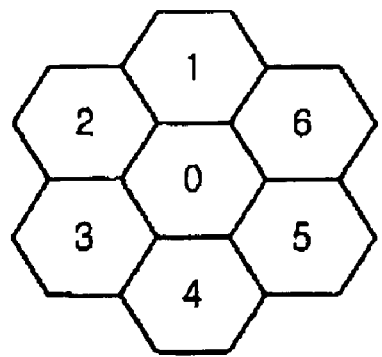
FIG. 5 is a view illustrating a method of allocating a Walsh codeword index to 1-tier cells according to one embodiment of the present invention.

FIG. 5 is a view illustrating a method of allocating a Walsh codeword index to 1-tier cells according to one embodiment of the present invention.

Referring to FIG. 5, if a 1-tier includes 7 cells, a plurality of mini Walsh groups (for example, 8 mini Walsh groups), that is, a combination of the Walsh codeword indexes is used for identifying 7 cells.

If the Walsh codes having the length of 16 (K=16) are used for forming the mini Walsh group, 16 orthogonal Walsh codes having the length of 16 can be formed as shown in Table 1.

TABLE 1

| Codeword indexes | Codewords |
|---|---|
| 0 | 1  1  1  1  1  1  1  1  1  1  1  1  1  1  1  1 |
| 1 | 1 -1  1 -1  1 -1  1 -1  1 -1  1 -1  1 -1  1 -1 |
| 2 | 1  1 -1 -1  1  1 -1 -1  1  1 -1 -1  1  1 -1 -1 |
| 3 | 1 -1 -1  1  1 -1 -1  1  1 -1 -1  1  1 -1 -1  1 |
| 4 | 1  1  1  1 -1 -1 -1 -1  1  1  1  1 -1 -1 -1 -1 |
| 5 | 1 -1  1 -1 -1  1 -1  1  1 -1  1 -1 -1  1 -1  1 |
| 6 | 1  1 -1 -1 -1 -1  1  1  1  1 -1 -1 -1 -1  1  1 |
| 7 | 1 -1 -1  1 -1  1  1 -1  1 -1 -1  1 -1  1  1 -1 |
| 8 | 1  1  1  1  1  1  1  1 -1 -1 -1 -1 -1 -1 -1 -1 |
| 9 | 1 -1  1 -1  1 -1  1 -1 -1  1 -1  1 -1  1 -1  1 |
| 10 | 1  1 -1 -1  1  1 -1 -1 -1 -1  1  1 -1 -1  1  1 |
| 11 | 1  1  1  1  1  1  1  1  1  1 -1 -1  1  1  1 -1 |
| 12 | 1  1  1  1 -1 -1 -1 -1 -1 -1 -1 -1  1  1  1  1 |
| 13 | 1 -1  1 -1 -1  1 -1  1 -1  1 -1  1  1 -1  1 -1 |
| 14 | 1  1 -1 -1 -1 -1  1  1 -1 -1  1  1  1  1 -1 -1 |
| 15 | 1 -1 -1  1 -1  1  1 -1 -1  1  1 -1  1 -1 -1  1 |

Referring to Table 1, the Walsh codes having the length of 16 can be represented as 16 codes including # 0 to # 15 indexes. That is, 16 codewords are formed per each codeword index. At this time, the 16 codewords are orthogonal to each other.

As shown in FIG. 5, if 7 cells (that is, $0^{th}$ to $6^{th}$ cells) are identified by the combination of 8 Walsh codewords, and 13 Walsh codes are selected from 16 Walsh codes as shown in Table 1, the 7 cells can be formed by combining 8 codeword indexes representing the # 0 to # 12 Walsh codewords.

At this time, if the combination of the codeword indexes is obtained according to Equation 1 under the condition of M=8, p=13, $a_C$=1, and $s_C$=cell number, a set of the Walsh codeword indexes for each cell can be obtained as represented in Table 2.

TABLE 2

| Codeword index & Cell No. | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 2 | 3 | 4 | 5 | 6 | 7 | 8 |
| 2 | 2 | 3 | 4 | 5 | 6 | 7 | 8 | 9 |
| 3 | 3 | 4 | 5 | 6 | 7 | 8 | 9 | 10 |
| 4 | 4 | 5 | 6 | 7 | 8 | 9 | 10 | 11 |
| 5 | 5 | 6 | 7 | 8 | 9 | 10 | 11 | 12 |
| 6 | 6 | 7 | 8 | 9 | 10 | 11 | 12 | 0 |

Referring to Table 2, the Walsh codeword index for the # 0 cell is calculated as $c_0$=(1×0+0) mod 13=0 according to Equation 1. Walsh codeword indexes for other cells may be calculated through the above manner, so the set $\{c_0, c_1, c_2, \ldots c_{M-1}\}$ of the Walsh code indexes can be represented as $\{0, 1, 2, 3, 4, 5, 6, 7\}$. Similarly, the Walsh codeword index for the # 6 cell is calculated as $c_0$=(1×0+6) mod 13=0, so the set $\{c_0, c_1, c_2, \ldots c_{M-1}\}$ of the Walsh code indexes can be represented as $\{6, 7, 8, 9, 10, 11, 12, 0\}$.

In the meantime, according to the present invention, codewords according to the combination of codeword indexes per each cell as shown in Table 2 can be formed with reference to Table 1 in order to create the mini Walsh group. In addition, the mini Walsh group is repeatedly formed by predetermined times and the mini Walsh group is multiplied by the PN symbol, thereby generating the preamble signal in the frequency domain.

Figure 6:
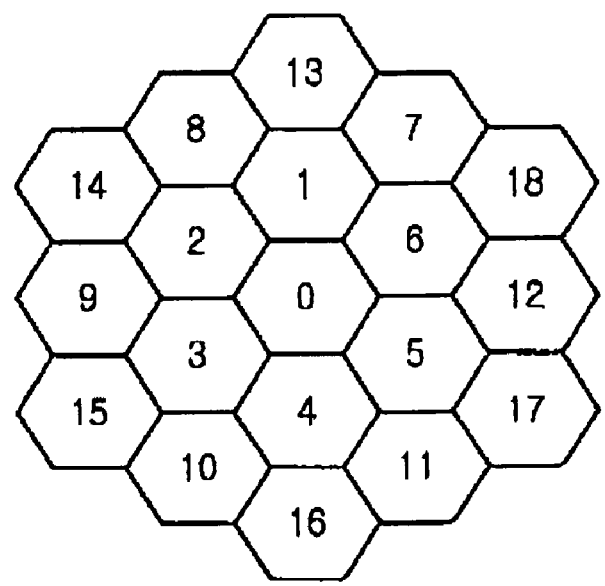
FIG. 6 is a view illustrating a method of allocating a Walsh codeword index to 2-tier cells according to one embodiment of the present invention.

FIG. 6 is a view illustrating a method of allocating the Walsh codeword index to 2-tier cells according to one embodiment of the present invention. A 2-tier includes 19 cells which can be identified by combining 8 Walsh code indexes according to the present invention. In addition, as mentioned above, $16^8$ cells can be identified by combining 8 Walsh code indexes having the length of 16.

When identifying the 19 cells by selecting 13 Walsh code indexes from 16 Walsh code indexes having the length of 16 and combining 13 Walsh code indexes from among 13 Walsh code indexes, different codeword indexes are allocated to adjacent cells in order to effectively identify the cells. Therefore, the combination of the codeword indexes for identifying the 19 cells shown in FIG. 6 can be formed as represented in Table 3 by using Equation 1.

TABLE 3

| Codeword index & Cell No. | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 2 | 3 | 4 | 5 | 6 | 7 | 8 |
| 2 | 2 | 3 | 4 | 5 | 6 | 7 | 8 | 9 |
| 3 | 3 | 4 | 5 | 6 | 7 | 8 | 9 | 10 |
| 4 | 4 | 5 | 6 | 7 | 8 | 9 | 10 | 11 |
| 5 | 5 | 6 | 7 | 8 | 9 | 10 | 11 | 12 |
| 6 | 6 | 7 | 8 | 9 | 10 | 11 | 12 | 0 |
| 7 | 0 | 2 | 4 | 6 | 8 | 10 | 12 | 1 |
| 8 | 1 | 3 | 5 | 7 | 9 | 11 | 0 | 2 |
| 9 | 2 | 4 | 6 | 8 | 10 | 12 | 1 | 3 |
| 10 | 3 | 5 | 7 | 9 | 11 | 0 | 2 | 4 |
| 11 | 4 | 6 | 8 | 10 | 12 | 1 | 3 | 5 |
| 12 | 5 | 7 | 9 | 11 | 0 | 2 | 4 | 6 |
| 13 | 6 | 8 | 10 | 12 | 1 | 3 | 5 | 7 |
| 14 | 7 | 9 | 11 | 0 | 2 | 4 | 6 | 8 |
| 15 | 8 | 10 | 12 | 1 | 3 | 5 | 7 | 9 |
| 16 | 9 | 11 | 0 | 2 | 4 | 6 | 8 | 10 |
| 17 | 10 | 12 | 1 | 3 | 5 | 7 | 9 | 11 |
| 18 | 11 | 0 | 2 | 4 | 6 | 8 | 10 | 12 |

Referring to Table 3, 16 orthogonal Walsh codewords can be generated when the Walsh codeword having the length of 16 is used, and 13 Walsh codewords are selected from the 16 orthogonal Walsh codewords in use.

Accordingly, the mini Walsh group for identifying each cell can be formed by combining 13 Walsh codewords (# 0 to # 12 Walsh codewords) into 8 Walsh codeword indexes (m=0 to 7).

Referring to Table 3, a slope of # 0 to # 6 cells, that is, a value of $a_c$ for # 0 to # 6 cells is set to 1 and a value of $a_c$ for # 7 to # 18 cells is set to 2. In addition, there is no codeword index having the same value of m between a # 1 cell and a # 13 cell which are adjacent to each other.

Figure 7:
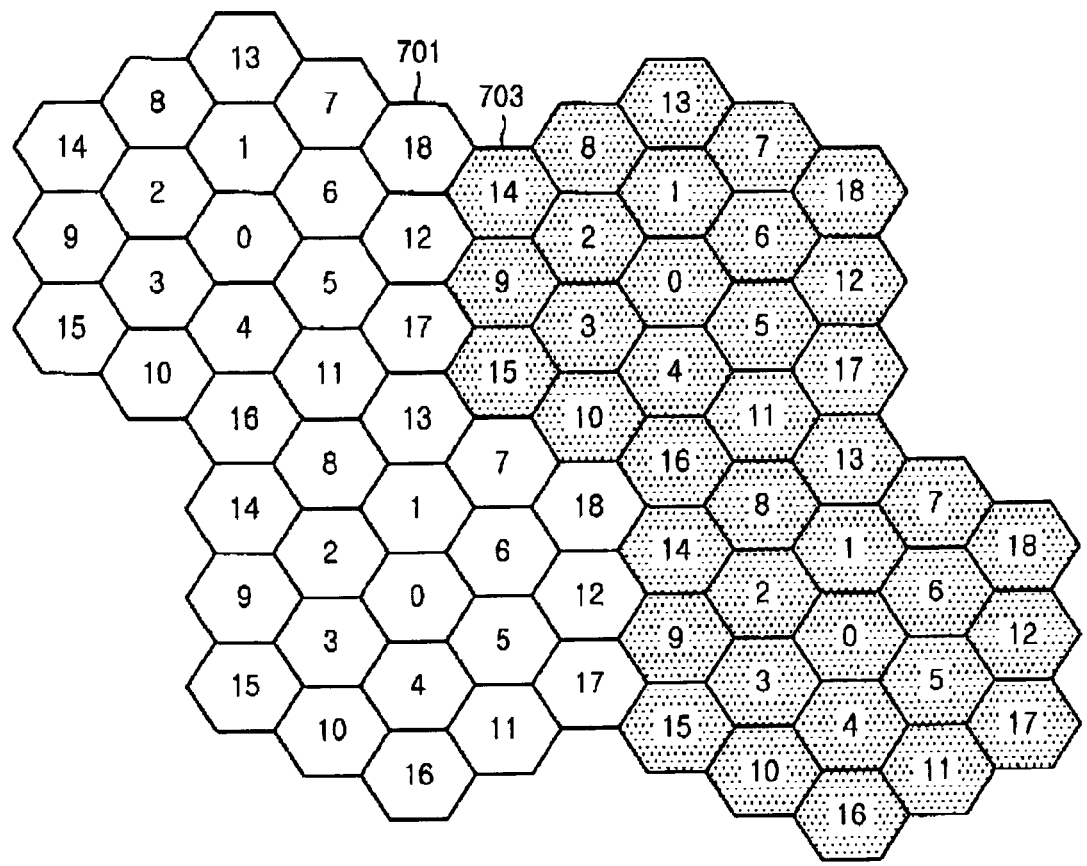
FIG. 7 is a view illustrating a method of allocating a Walsh codeword index to four 2-tier cells according to one embodiment of the present invention.

FIG. 7 is a view illustrating a method of allocating a Walsh codeword index to four 2-tier cells according to one embodiment of the present invention.

Referring to FIG. 7, four 2-tier cells are formed adjacent to the 2-tier cells shown in FIG. 6. In the same manner as the 2-tier cells shown in FIG. 6, codeword indexes shown in Table 3 can be allocated to one 2-tier cell. That is, the codeword indexes shown in Table 3 can be allocated to each 2-tier cell. In addition, it is preferred to allocate the codeword indexes such that there is no codeword index having the same value of m between adjacent 2-tier cells.

For example, as shown in FIG. 6, a # 14 cell and a # 18 cell are not adjacent to each other in a single 2-tier structure. However, as shown in FIG. 7, they can be adjacent to each other if they are aligned in different 2-tier structures. Accordingly, there is no codeword index having the same value of m between the # 18 cell 701 and the # 14 cell 703.

Figure 8:
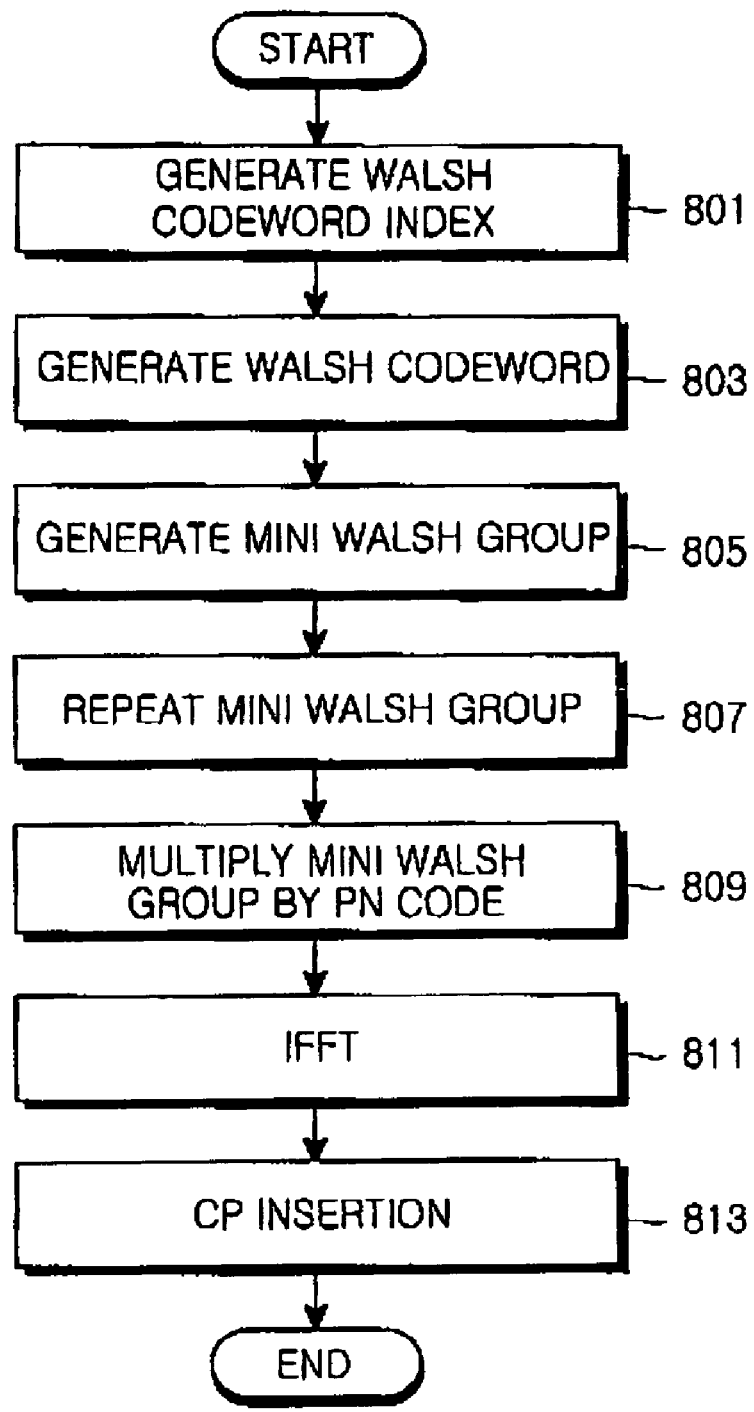
FIG. 8 is a flowchart illustrating a preamble signal generating procedure according to one embodiment of the present invention.

FIG. 8 is a flowchart illustrating a preamble signal generating procedure according to one embodiment of the present invention.

Referring to FIG. 8, Walsh codeword indexes are generated corresponding to the cell ID of each cell (step 801). As described above with reference to Equation 1, the Walsh codeword indexes are created in such a manner that the Walsh codeword indexes corresponding to each cell can be differentiated by combining the Walsh codeword indexes through a modulo operation.

When the Walsh codeword indexes have been generated corresponding to the cell ID of each cell, Walsh codewords corresponding to the Walsh codeword indexes are generated (step 803). A mini Walsh group is created by aligning the Walsh codewords according to a combination order of the Walsh codeword indexes (step 805).

The mini Walsh group is repeated by predetermined times (step 807). The repeated mini Walsh group is multiplied by a predetermined PN code, thereby generating a preamble signal in the frequency domain (step 809).

The preamble signal is converted into a parallel preamble signal by means of a serial to parallel converter and the parallel preamble signal is inputted into each input point of an IFFT unit so that the parallel preamble signal is converted into a time domain preamble signal (step 811). A guard interval is inserted into the time domain preamble signal (step 813). Then, the signal is RF-processed, and then, is transmitted to each user equipment.

Figure 9:
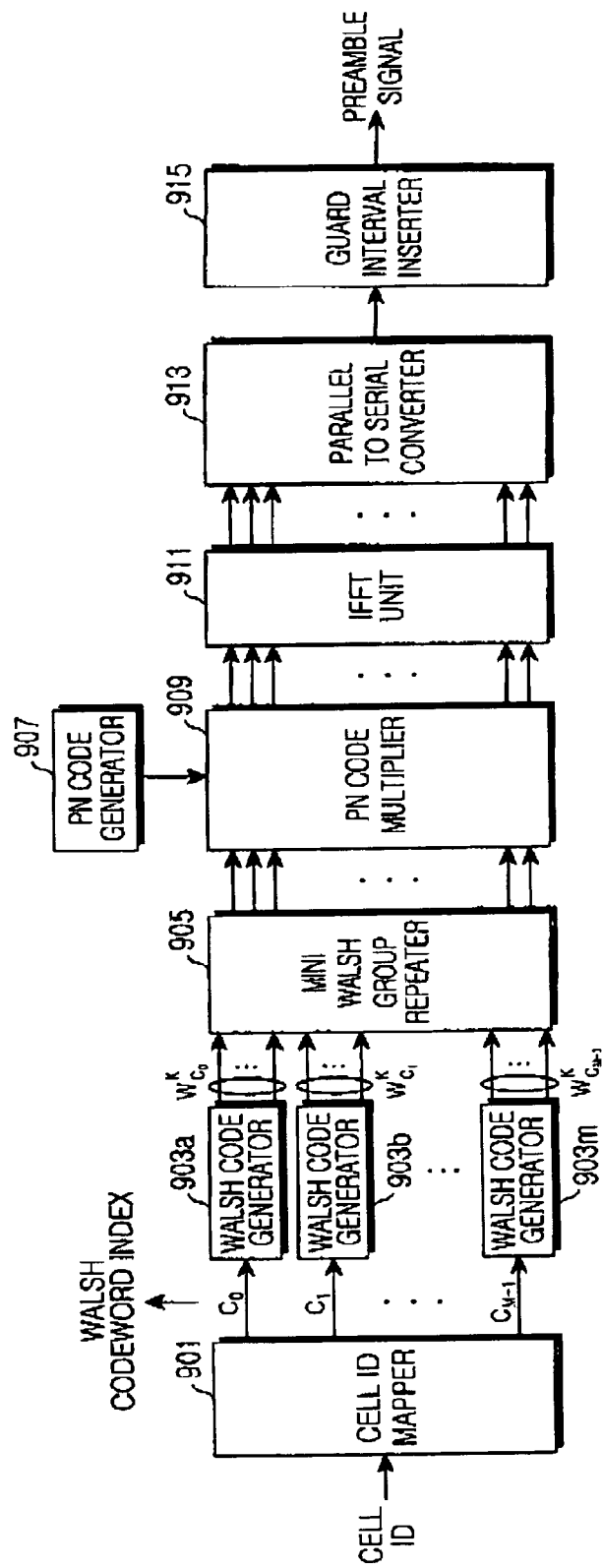
FIG. 9 is a block diagram illustrating a structure of a preamble signal generator according to one embodiment of the present invention.

FIG. 9 is a block diagram illustrating a structure of a preamble signal generator according to one embodiment of the present invention. The preamble signal generator of the present invention includes a cell ID mapper 901, a plurality of Walsh code generators 903a to 903m, a mini Walsh group repeater 905, a PN code generator 907, a PN code multiplier 909, an IFFT unit 911, a parallel to serial converter 913, and a guard interval inserter 915.

The cell ID mapper 901 receives ID information of each cell and generates a set $\{c_0, c_1, c_2, \ldots c_{M-1}\}$ of the Walsh code indexes according to ID information of each cell by utilizing Equation 1. The M Walsh code generators 903a to 903m receive the Walsh code index $c_i$ and generate a Walsh codeword corresponding to the Walsh code index $c_i$. Herein, i is one of 0 to M-1.

The Walsh codewords generated from M Walsh code generators 903a to 903m are combined into one mini Walsh group and the mini Walsh group is repeated by predetermined times (for example, J times) in a mini Walsh group repeater 905, so that a W symbol is outputted from the mini Walsh group repeater 905. The W symbol outputted from the mini Walsh group repeater 905 is multiplied by the PN code (that is, a P symbol) outputted from the PN code generator 907 by means of the PN code multiplier 909.

The frequency domain preamble signal is subject to IFFT while passing through the IFFT unit 911 and is converted into a serial preamble signal by means of the parallel to serial converter 913. In addition, a guard interval (for example, CP) is inserted into the serial preamble signal by means of the guard interval inserter 915 so that a time domain preamble signal is generated.

Figure 10:
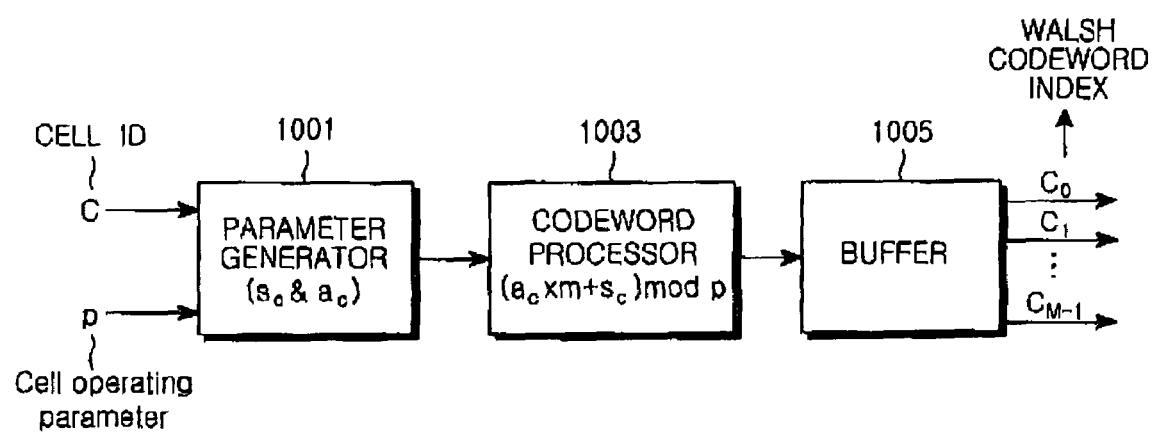
FIG. 10 is a block diagram illustrating a structure of a cell ID mapper of a preamble signal generator according to one embodiment of the present invention.

FIG. 10 is a block diagram illustrating a structure of the cell ID mapper of the preamble signal generator according to one embodiment of the present invention. The cell ID mapper 901 of the preamble signal generator includes a parameter generator 1001, a codeword processor 1003, and a buffer 1005.

The parameter generator 1001 receives a cell ID (that is, a value of C) and a cell operating parameter (that is, a value of p) and generates $a_c$ which is a slope corresponding to the cell C and $s_c$ which is an initial Walsh codeword index value of the cell C. The codeword processor 1003 receives the $a_c$ and $s_c$ from the parameter generator 1001 and performs a calculation according to Equation 1. The codeword processor 1003 temporarily stores the calculation result in the buffer 1005 and outputs final Walsh codeword index values $c_0, c_1, c_2, \ldots$ and $c_{M-1}$, of the cell C.

Figure 11:
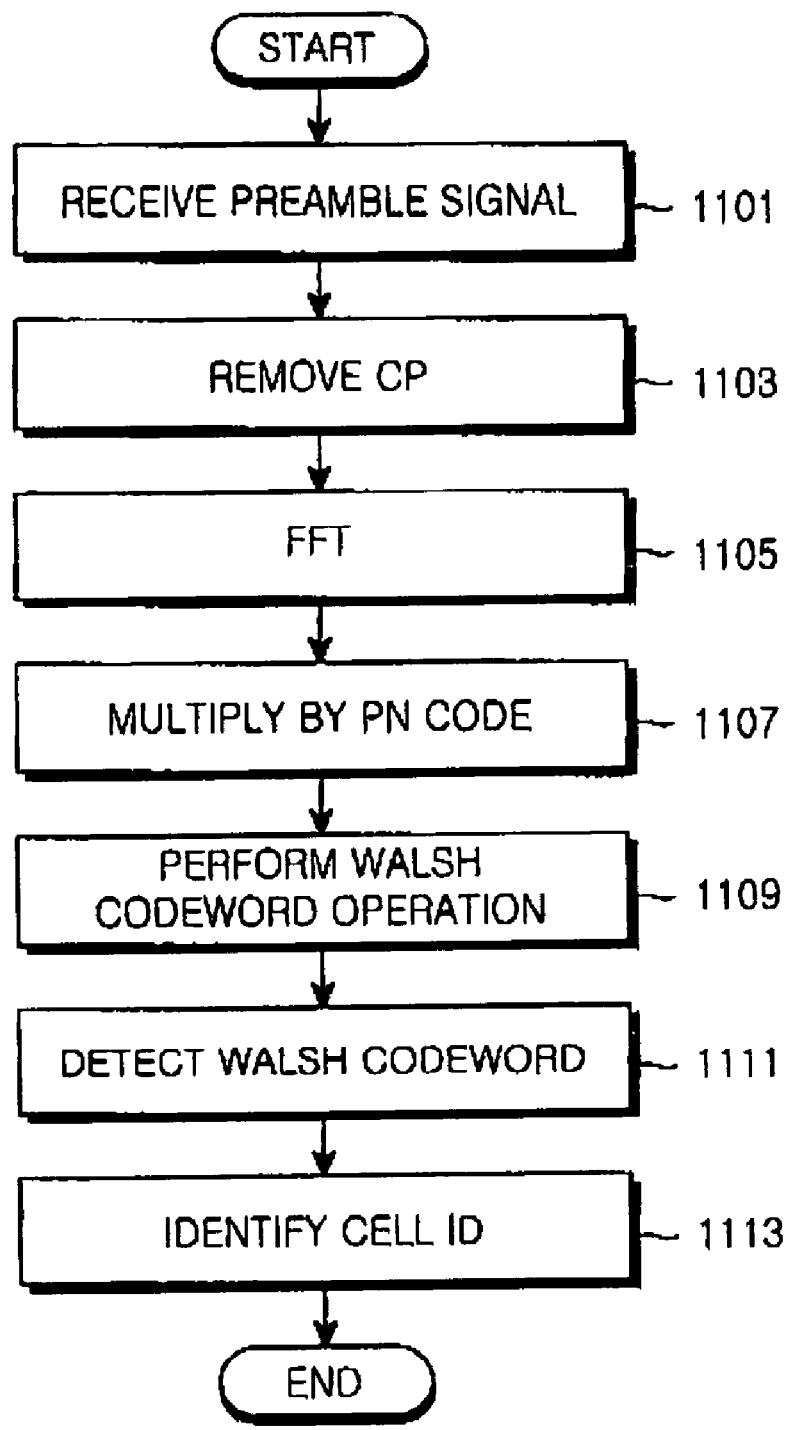
FIG. 11 is a flowchart illustrating a procedure for identifying a cell ID by receiving a preamble signal according to one embodiment of the present invention.

FIG. 11 is a flowchart illustrating a procedure for identifying a cell ID by receiving a preamble signal according to one embodiment of the present invention.

The preamble signal is received in a specific user equipment (step 1101). The preamble signal is RF-processed by means of the RF processor and the guard interval (that is, CP) is removed from the preamble signal by means of the guard interval remover (step 1103). An FFT operation is carried out with respect to the preamble signal (step 1105). The FFT preamble signal is a frequency domain preamble signal. The FFT preamble signal is multiplied by the PN code, which is identical to the PN code multiplied in the transmitter (step 1107).

The above preamble signal forms the Walsh codeword corresponding to the Walsh codeword index per each length of the Walsh codeword. Accordingly, a correlation operation is carried out with respect to the preamble signal in relation to the Walsh codewords per each length of the Walsh codeword (step 1109). A peak value is detected based on the result of the above correlation operation, thereby detecting the Walsh codeword, which has been allocated when transmitting the signal (step 1111). The cell ID is finally identified by combining the Walsh codeword indexes of the detected Walsh codewords (step 1113).

Figure 12:
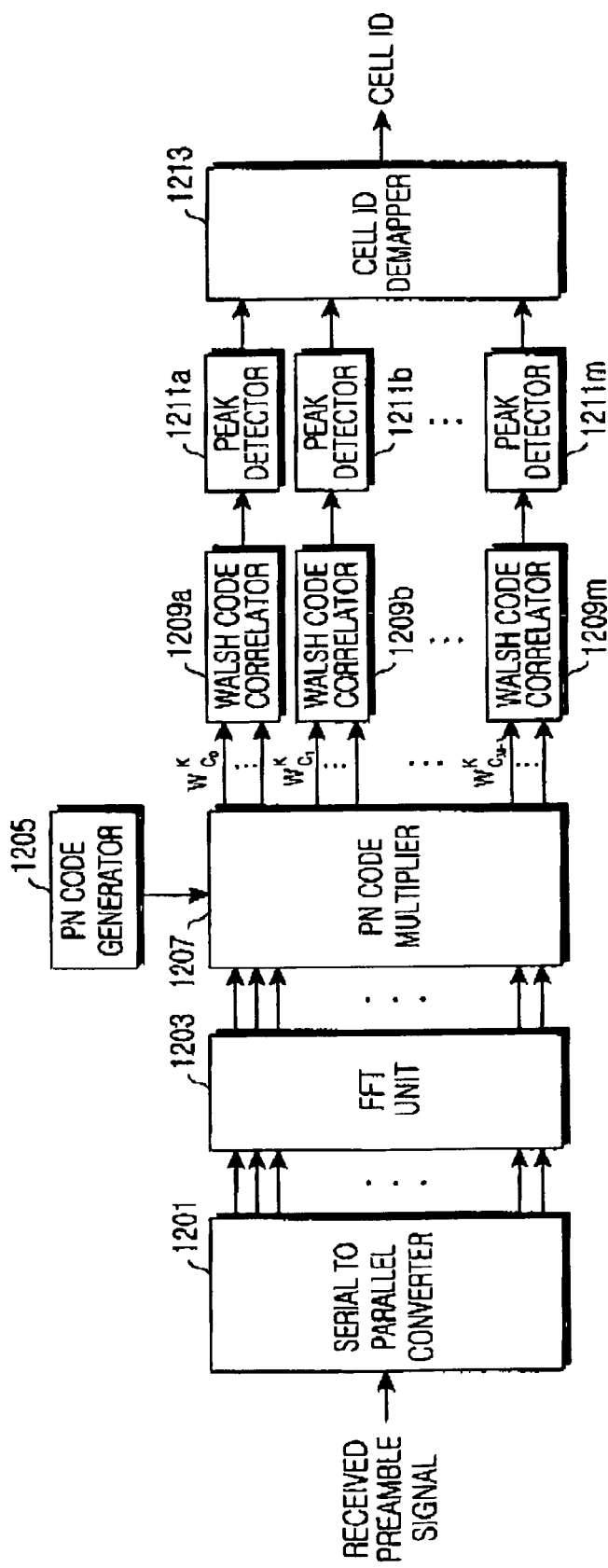
FIG. 12 is a block diagram illustrating a structure of a receiver for identifying a cell ID by using a preamble signal according to one embodiment of the present invention.

FIG. 12 is a block diagram illustrating a structure of a receiver for identifying the cell ID by using the preamble signal according to one embodiment of the present invention. The receiver of the present invention includes a serial to parallel converter 1201, an FFT unit 1203, a PN code generator 1205, a PN code multiplier 1207, a plurality of Walsh code correlators 1209a to 1209m, a plurality of peak detectors 1211a to 1211m, and a cell ID demapper 1213.

The preamble signal received in the receiver is converted into a parallel signal by means of the serial to parallel converter 1201. Then, the parallel signal is subject to a FFT by means of the FFT unit 1203 so that a frequency domain preamble signal is outputted. The PN code multiplier 1207 multiplies the output signal of the FFT unit 1203 by the PN code, which is identical to the PN code outputted from the PN code generator 1205, so that the Walsh codeword corresponding to the Walsh codeword index, which has been allocated when transmitting the signal, is outputted per each length of the Walsh codeword.

As mentioned above, the PN code generated from the PN code generator 1205 is commonly used in all base stations and the PN code multiplier 1207 multiplies the frequency domain preamble signal by the PN code, thereby generating the W symbol including Walsh codeword sets.

The Walsh code correlators 1209a to 1209m detect a correlation value of each Walsh codeword in order to find the index of the Walsh codewords forming the mini Walsh group $W_g$ of the frequency domain preamble signal. The M peak detectors 1211a to 1211m compares the correlation values of the Walsh codewords, thereby detecting the Walsh codeword indexes. In addition, the cell ID demapper 1213 detects cell ID) information based on the Walsh codeword indexes $c_0$, $c_1$, $c_2$, . . . and $c_{M-1}$ detected by the peak detectors 1211a to 1211m.

Hereinafter, a channel estimation procedure by using the preamble signal according to one embodiment of the present invention will be described.

Figure 13:
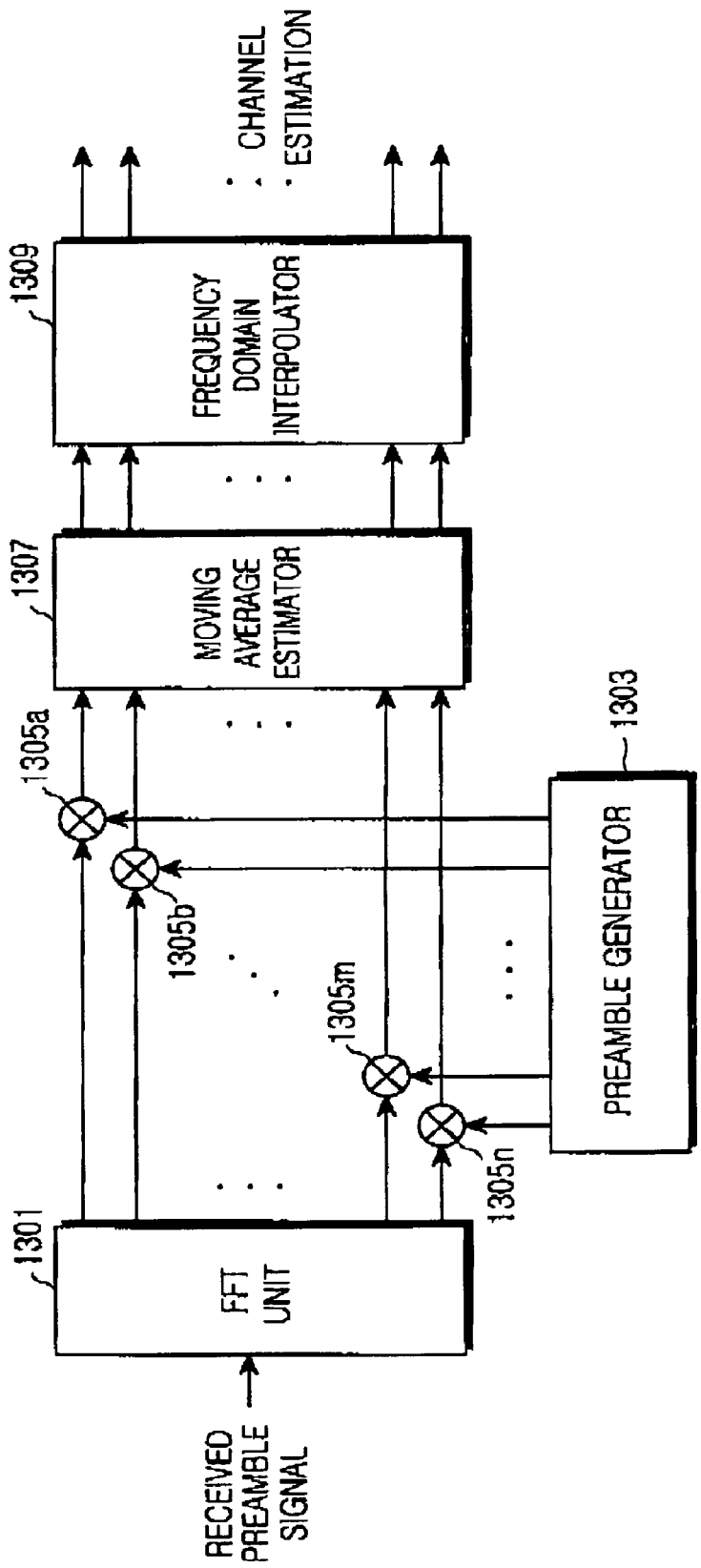
FIG. 13 is a block diagram illustrating a structure of a channel estimator, which does not use null carrier information according to one embodiment of the present invention.
Figure 14:
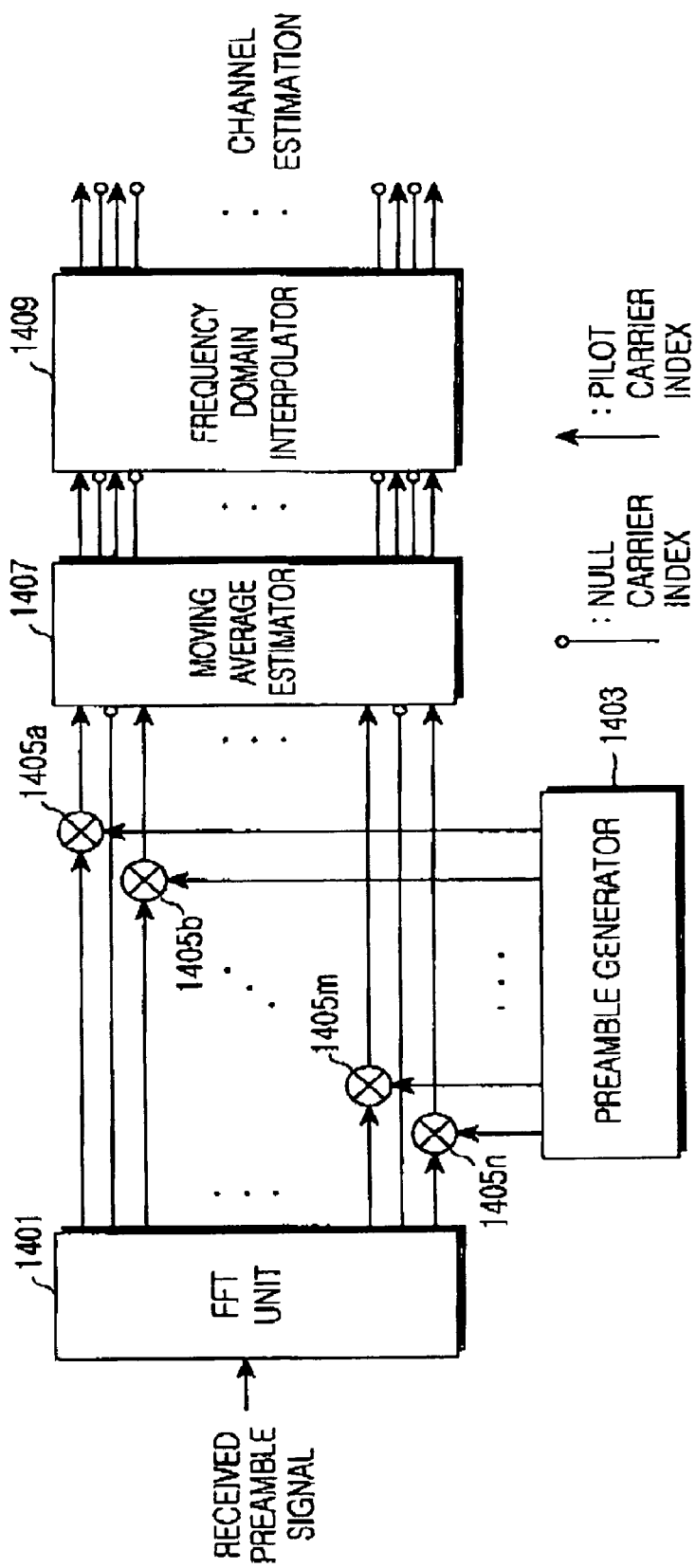
FIG. 14 is a block diagram illustrating a structure of a channel estimator using null carrier information according to one embodiment of the present invention.

FIG. 13 is a block diagram illustrating a structure of a channel estimator, which does not use null carrier information according to one embodiment of the present invention, and FIG. 14 is a block diagram illustrating a structure of a channel estimator using null carrier information according to one embodiment of the present invention.

The channel estimator of the present invention includes an FFT unit 1301 or 1401, a frequency domain preamble generator 1303 or 1403, a plurality of multipliers 1305a-1305n or 1405a-1405n, a moving average estimator 1307 or 1407, and a frequency domain interpolator 1309 or 1409.

As mentioned above, the channel estimator shown in FIG. 13 does not use null carrier information and the channel estimator shown in FIG. 14 may use null carrier information.

Referring to FIGS. 13 and 14, the preamble signal is converted into a frequency domain signal while passing through the FFT unit 1301 or 1401. The frequency domain preamble generator 1303 or 1403 converts the frequency domain signal into a frequency domain preamble signal corresponding to each cell based on the estimated cell ID information. Then, the frequency domain preamble signal is multiplied by an output of the frequency domain preamble generator 1303 or 1403 according to sub-carrier frequency indexes, so the signal outputted through the above procedure has a channel component exclusively.

After that, the channel value per each sub-carrier index is estimated as a moving average value of a predetermined interval by means of the moving average estimator 1307 or 1407. The frequency domain interpolator 1309 or 1409 may estimate a channel value of a sub-carrier index, which has not been transmitted, based on an estimated channel value of a neighbor sub-carrier index.

According to the present invention, the preamble signal is multiplied by the PN code, which are commonly used in all base stations, when searching the cell in each user equipment. Therefore, if the PN code component is removed, only Walsh codes having a superior correlation characteristic between codes may remain. Thus, cell search performance can be improved even if interference occurs between cells, so high-speed handover can be achieved.

EXPERIMENTAL EXAMPLE

Tables 4 illustrate the number of calculations required for identifying cells according to the present invention in comparison with that of the prior art using PN codes for each base station.

TABLE 4

| Number of cell Ids | PN code is used only | Present invention (Walsh code length, number of sub-carrier groups and repetition time of each Walsh code | Note |
| --- | --- | --- | --- |
| 16 | 32768 | 8192 (4, 2, 256) | Four times |
| 64 | 99328 | 16384 (8, 2, 128) | Eight times |
| 256 | 524288 | 32768 (16, 2, 64) | Sixteen times |
| 512 | 1048576 | 16384 (8, 3, 85) | Sixty four times |

In Tables 4, it is assumed that 2048 sub-carriers are used for the preamble signal. As can be understood from Tables 4, the present invention can reduce the amount of calculation, memories, and power loss as compared with the prior art.

Figure 15:
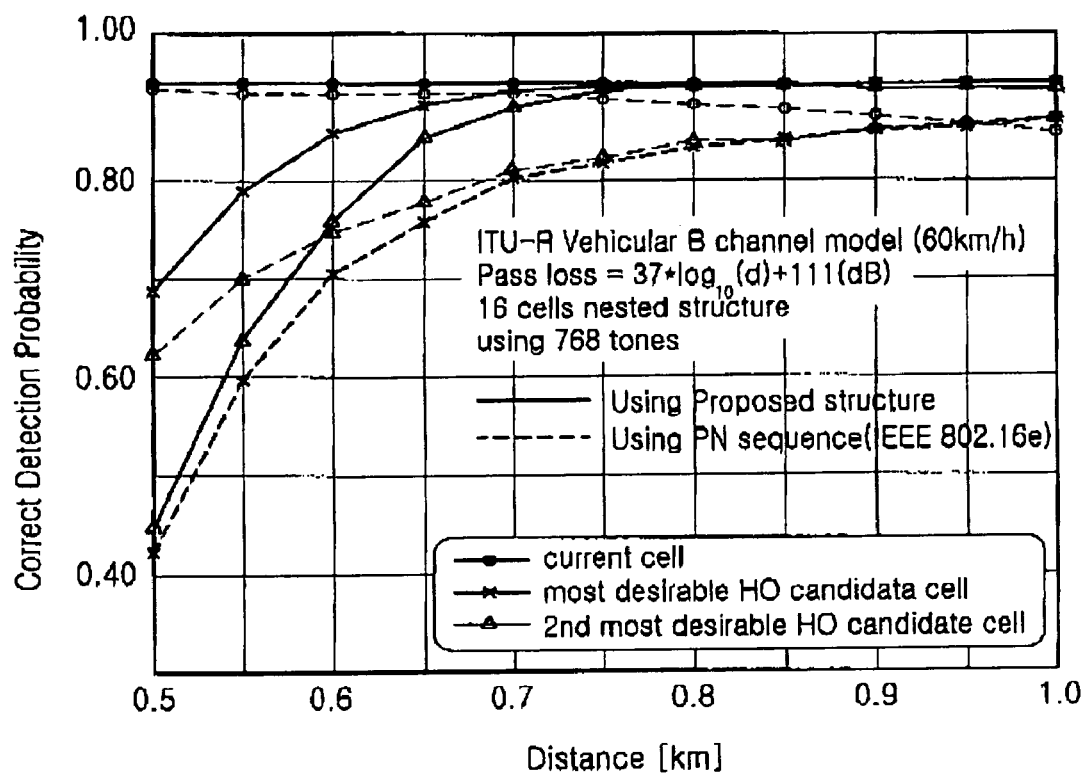
FIG. 15 is a graph illustrating correction detection probability of the present invention in comparison with that of the prior art.

FIG. 15 is a graph illustrating a correction detection probability as a function of a distance between an embodiment the present invention and the prior art. The X-axis represents a distance between the base station and user equipment and the Y-axis represents the correction detection probability. As can be understood from the graph, the preamble signal of the present invention shown as a solid line represents a superior correction detection probability as compared with the preamble signal of the prior art shown as a dotted line.

Figure 16:
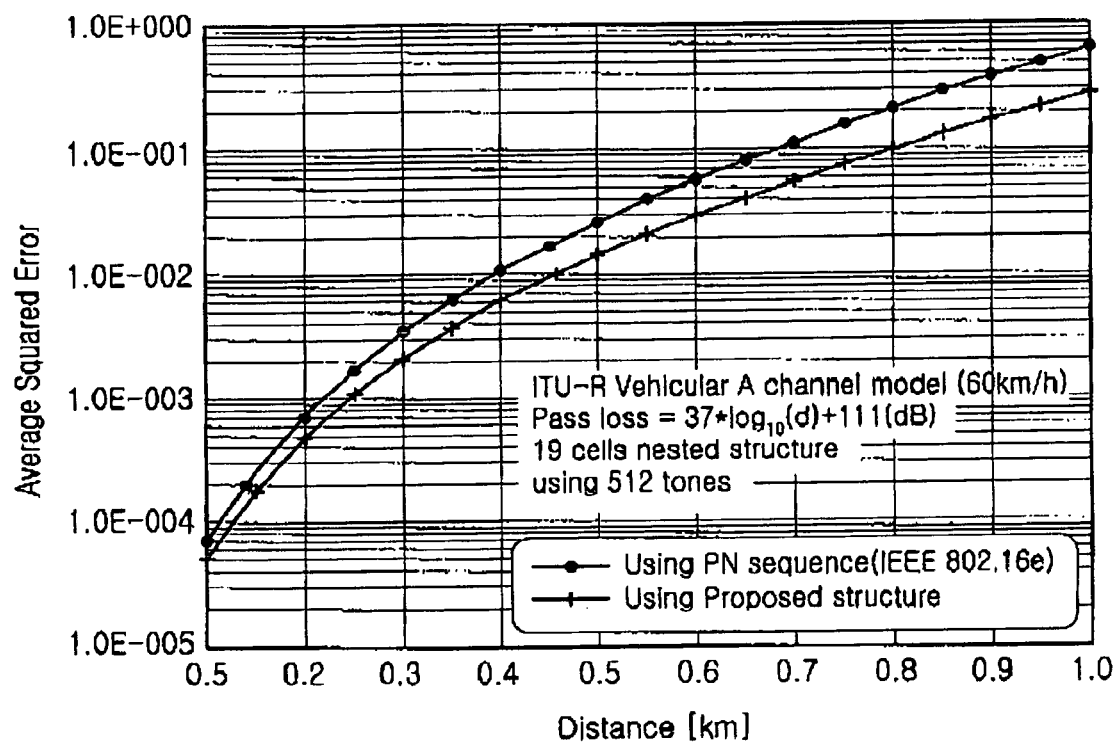
FIG. 16 is a graph illustrating channel estimation performance an embodiment of the present invention in comparison with that of the prior art.

FIG. 16 is a graph illustrating channel estimation performance of the present invention in comparison with that of the prior art. The X-axis represents a distance between the base station and user equipment and the Y-axis represents an average squared error. As can be understood from the graph, the present invention represents a lower average squared error as compared with the prior art. That is, the present invention represents superior channel estimation performance.

Referring to FIGS. 15 and 16, it will be understood that channel estimation performance and correction detection may improve when employing the preamble signal according to the present invention.

As described above, if the Walsh codeword is allocated according to a Walsh codeword index corresponding to the cell ID by using a reference signal (that is, a preamble signal or a mid-amble signal), interference between neighbor cells caused by different Walsh codewords can be reduced when performing the channel estimation in a multi-cell environment, thereby improving channel estimation performance. In addition, the preamble/mid-amble signal of the present invention may optimize a cell alignment so that interference between neighbor cells can be reduced and a cell alignment pattern is simplified. In particular, if the preamble/mid-amble signal of the present invention is applied to an abnormal multi-cell structure or an overlapping cell region of a new cell, channel estimation performance can be significantly improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of generating a preamble signal in an orthogonal frequency division multiple access (OFDMA) mobile communication system, the method comprising the steps of:

generating, at a Walsh code generator of the OFDMA mobile communication system, a Walsh symbol for a cell identification by combining Walsh codewords having a predetermined length; and generating, at a multiplier of the OFDMA mobile communication system, the preamble signal by multiplying the Walsh symbol by a pseudo noise (PN) symbol having a length identical to a length of the Walsh symbol, wherein the step of generating a Walsh symbol further comprises generating, at a mini Walsh group generator of the Walsh code generator, a mini Walsh group for the cell identification and repeating the mini Walsh group by a predetermined number of times to generate the Walsh symbol, and wherein the step of generating the mini Walsh group comprises determining at least one Walsh codeword index and aligning at least one Walsh codeword corresponding to the determined at least one Walsh codeword index, and the at least one Walsh codeword is selected according to $cm=(ac \times m+sc) \bmod p$, wherein C of ac and sc is cell ID information of each cell, m is a Walsh codeword interval index of a specific mini Walsh group Wg, ac is a slope of a cell C, sc is an initial Walsh codeword index, and mod is a modulo operation.

2. The method as claimed in claim 1, wherein the preamble signal is a frequency domain signal.

3. The method as claimed in claim 1, wherein the step of generating the mini Walsh group includes selecting predetermined Walsh codewords from among orthogonal Walsh codewords having a predetermined length and aligning the selected Walsh codewords.

4. The method as claimed in claim 1, wherein the length of the Walsh symbol corresponds to a number of input points of an inverse fast Fourier transformer (IFFT unit) used for performing an IFFT with regard to the preamble signal.

5. An apparatus for generating a preamble signal in an orthogonal frequency division multiple access (OFDMA) mobile communication system, the apparatus comprising:

a Walsh code generator for generating a Walsh symbol for a cell identification by combining Walsh codewords having a predetermined length;

a pseudo noise (PN) code generator for generating a PN symbol having a length identical to a length of the Walsh symbol; and a multiplier for generating the preamble signal by multiplying the Walsh symbol generated from the Walsh code generator by the PN symbol generated from the PN code Generator, wherein the Walsh code generator comprises a mini Walsh group generator for generating a mini Walsh group for the cell identification and a mini Walsh group repeator for repeating the mini Walsh group by a predetermined number of times, thereby generating the Walsh symbol, and wherein the mini Walsh group generator selects at least one Walsh codeword index, and aligns the Walsh codewords corresponding to the selected at least one Walsh codeword index, thereby generating the mini Walsh group, and the Walsh codewords are selected according to:

$c_{m=(a_C} \times m+s_C) \bmod p$, wherein C of $a_C$ and $s_C$ is cell ID information of each cell, m is a Walsh codeword interval index of a specific mini Walsh group $W_g$, $a_C$ is a slope of a cell C, $s_C$ is an initial Walsh codeword index, and mod is a modulo operation.

6. The apparatus as claimed in claim 5, wherein the preamble signal is a frequency domain signal.

7. The apparatus as claimed in claim 5, wherein the mini Walsh group generator selects predetermined Walsh codewords from among orthogonal Walsh codewords having a predetermined length and sequentially aligns the selected Walsh codewords, thereby generating the mini Walsh group.

8. The apparatus as claimed in claim 5, wherein the length of the Walsh symbol corresponds to a number of input points of an inverse fast Fourier transformer (IFFT unit) used for performing an IFFT with regard to the preamble signal.

9. The apparatus as claimed in claim 5, wherein the apparatus further includes a cell ID mapper which selects Walsh code indexes and maps the Walsh code indexes according a cell ID allocated to each cell.

10. The apparatus as claimed in claim 9, wherein the cell ID mapper includes a parameter generator for generating a predetermined slope value and an initial Walsh codeword index value for each cell according the cell ID allocated to each cell, and a codeword processor for creating codeword indexes for a cell identification based on parameter values generated from the parameter generator.

11. The apparatus as claimed in claim 10, wherein the codeword processor creates the codeword indexes.

12. A method of identifying cells by receiving a preamble signal in an orthogonal frequency division multiple access (OFDMA) mobile communication system, the method comprising the steps of:

receiving, at a fast Fourier transformer of the OFDMA communication system, the preamble signal generated for a cell identification by multiplying a Walsh symbol, which is created by combining Walsh codewords having a predetermined length, by a pseudo noise (PN) symbol having a length identical to a length of the Walsh symbol;

detecting the Walsh symbol at a pseudo noise (PN) code multiplier of the OFDMA communication system; and identifying, at a cell identifier demapper of the OFDMA mobile communication system, a cell mapped into the Walsh symbol based on the detected Walsh symbol;

wherein the Walsh codewords are selected according to:

$cm=(ac \times m+sc) \bmod p$, wherein C of ac and sc is cell ID information of each cell, m is a Walsh codeword interval index of a specific mini Walsh group Wg, ac is a slope of a cell C, sc is an initial Walsh codeword index, and mod is a modulo operation.

13. The method as claimed in claim 12, wherein the step of detecting the Walsh symbol further includes multiplying the received preamble signal by the PN symbol, performing a correlation operation with respect to the preamble signal multiplied by the PN symbol in relation to the Walsh codewords per each predetermined length of the Walsh codewords, and detecting a peak value from resultant values obtained through the correlation operation.

14. An apparatus for identifying cells by receiving a preamble signal in an orthogonal frequency division multiple access (OFDMA) mobile communication system, the apparatus comprising:

a fast Fourier transformer receiving the preamble signal generated by multiplying a Walsh symbol, which is created by combining Walsh codewords having a predetermined length, by a pseudo noise (PN) symbol having a length identical to a length of the Walsh symbol and performing an FFT (fast Fourier transform) with respect to the received preamble signal so as to form an FFT preamble symbol;

a PN code multiplier for multiplying the FFT preamble signal by the PN symbol; and a cell identifier demapper for identifying cells based on values outputted from the PN code Multiplier;

wherein the Walsh codewords are selected according to:

$c_m = (a_C \times m + s_C) \mod p$, wherein C of $a_C$ and $s_C$ is cell ID information of each cell, m is a Walsh codeword interval index of a specific mini Walsh group $W_g$, $A_C$ is a slope of a cell C, $s_C$ is an initial Walsh codeword index and mod is a modulo operation.

15. The apparatus as claimed in claim 14, wherein the cell identifier includes a Walsh code correlator for performing a correlation operation with respect to the preamble signal multiplied by the PN symbol in relation to the Walsh codewords per predetermined length of the Walsh codewords, and a peak detector for detecting a peak value from resultant values obtained through the correlation operation.

* * * * *

UNITED STATES PATENT AND TRADEMARK OFFICE
CERTIFICATE OF CORRECTION

PATENT NO. : 7,580,400 B2
APPLICATION NO. : 10/991895
DATED : August 25, 2009
INVENTOR(S) : Sung et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

Fourteenth Day of September, 2010

David J. Kappos
*Director of the United States Patent and Trademark Office*